(12) United States Patent
Alshinnawi et al.

(10) Patent No.: US 9,392,111 B2
(45) Date of Patent: Jul. 12, 2016

(54) REDUCTION OF ON-HOLD CALL BANDWIDTH CONSUMPTION

(71) Applicant: LENOVO ENTERPRISE SOLUTIONS (SINGAPORE) PTE. LTD., Singapore (SG)

(72) Inventors: Shareef F. Alshinnawi, Durham, NC (US); Gary D. Cudak, Creedmoor, NC (US); Edward S. Suffern, Chapel Hill, NC (US); John M. Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 284 days.

(21) Appl. No.: 14/032,344

(22) Filed: Sep. 20, 2013

(65) Prior Publication Data

US 2015/0085882 A1    Mar. 26, 2015

(51) Int. Cl.
*H04M 3/51* (2006.01)
*H04M 3/56* (2006.01)
*H04M 3/428* (2006.01)

(52) U.S. Cl.
CPC .......... *H04M 3/5141* (2013.01); *H04M 3/4283* (2013.01); *H04M 3/561* (2013.01)

(58) Field of Classification Search
None
See application file for complete search history.

(56) References Cited

U.S. PATENT DOCUMENTS

| | | | |
|---|---|---|---|
| 5,701,295 A * | 12/1997 | Bales et al. | 370/271 |
| 6,526,041 B1 | 2/2003 | Shaffer et al. | |
| 6,853,719 B2 | 2/2005 | McCormack et al. | |
| 6,912,393 B1 * | 6/2005 | Rodriguez et al. | 455/450 |
| 7,076,035 B2 | 7/2006 | Loudermilk | |
| 7,558,251 B1 | 7/2009 | Huang et al. | |
| 7,616,742 B2 | 11/2009 | Schoeneberger et al. | |
| 8,121,262 B1 | 2/2012 | Michaelis | |
| 2004/0240407 A1 * | 12/2004 | Ehrsam et al. | 370/328 |
| 2006/0188087 A1 * | 8/2006 | Kortum et al. | 379/266.01 |
| 2007/0299939 A1 | 12/2007 | Johnston | |
| 2010/0245111 A1 | 9/2010 | Gaensler et al. | |

OTHER PUBLICATIONS

IBM, Method and Process to allow the client to personalize hold music; Jul. 10, 2009; Database: IP.com; IP.com No. IPCOM000185085D.

* cited by examiner

*Primary Examiner* — Noel Beharry
*Assistant Examiner* — Aung Oo
(74) *Attorney, Agent, or Firm* — Edward J. Lenart; Katherine S. Brown; Kennedy Lenart Spraggins LLP

(57) ABSTRACT

A computer processor determines that a call has been placed on hold. The computer processor sends a first packet to a local exchange carrier (LEC) of the calling device, wherein the first packet includes instructions to release the bandwidth of the call placed on-hold, between the LEC and a recipient of the call. The computer processor sends a second packet intermittently to the LEC, wherein the second packet maintains a connection between the calling device of the call and the LEC. The computer processor determines that a representative is available, wherein the representative is the recipient of the call, and in response to determining the representative that is available responds to the call, the computer processor sending a third packet to connect the calling device of the call to the representative that is available.

17 Claims, 5 Drawing Sheets

REDUCTION OF ON-HOLD CALL BANDWIDTH CONSUMPTION

BACKGROUND OF THE INVENTION

The present invention relates generally to the field of call center bandwidth utilization, and more particularly to reducing voice call bandwidth consumed by calls placed on hold.

Customer representative call centers remain pervasive in offering a communication pathway for those seeking service to connect via voice call to support personnel call receivers that provide services. A common experience for callers is to receive an automated message acknowledging that support personnel are not available, and to be put on hold.

Call centers are staffed to maximize the productive time of the answering representatives, therefore, to minimize idle time, calls received by a call center typically outnumber the calls handled by representatives within the same period of time. The excess calls are put on-hold continuing to consume allocated bandwidth, and often the on-hold calls include recorded audio content delivered while the call is on-hold. The bandwidth used to support calls on-hold is unproductive.

There are different approaches to handling calls that are put on-hold. In some cases an automated message informs a caller that support personnel, answering representatives, or other contacts they are trying to reach, are not available and instruct the caller to call back at a later time. In other cases the message played informs the caller that they are important, however, they must wait and remain connected until an answering representative is available. Often the caller is connected to a channel that plays music, or a mixture of messages, advertisements and music, while the caller waits to be connected to one of the representatives.

On-hold calls continue to consume an amount of bandwidth of the telecommunications capacity of the entity to which the call was placed, while the on-hold call remains connected. Callers lack control of the content they must listen to while remaining on-hold or risk missing being connected to the support personnel or answering representative they intended to contact. Further, connection bandwidth is wasted in an unproductive delivery of music or other content while calls remain on-hold. For instances in which the number of calls on-hold is high, the unproductive bandwidth consumed can be significant.

BRIEF SUMMARY

Embodiments of the present invention disclose a method, computer program product, and system for reducing bandwidth consumption of calls put on-hold. A computer processor determines that a call has been placed on hold. The computer processor sends a first packet to a local exchange carrier (LEC) of the calling device, wherein the first packet includes instructions to release the bandwidth of the call placed on-hold, between the LEC and a recipient of the call. The computer processor sends a second packet intermittently to the LEC, wherein the second packet maintains a connection between the calling device of the call and the LEC. The computer processor determines that a representative is available, wherein the representative is the recipient of the call, and in response to determining the representative that is available responds to the call, the computer processor sending a third packet to connect the calling device of the call to the representative that is available.

DETAILED DESCRIPTION

Figure 1:
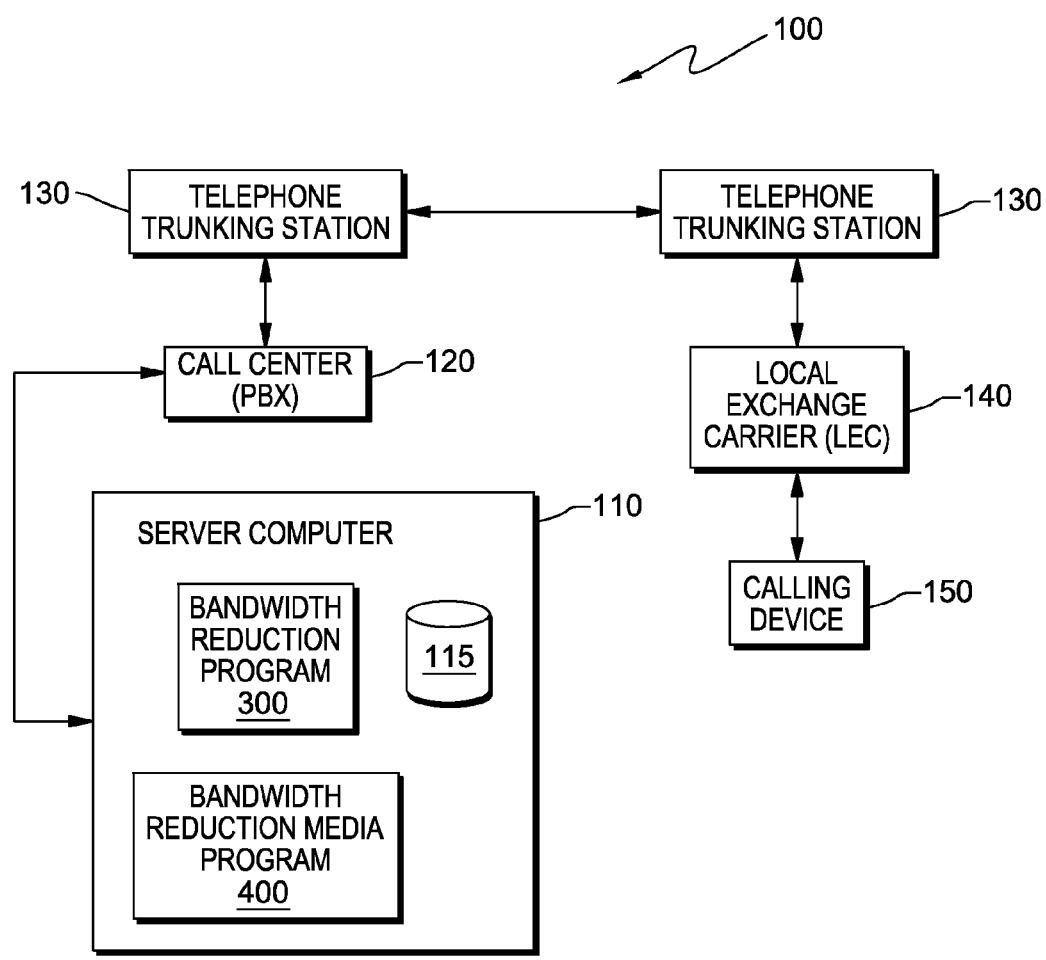
FIG. 1 is a functional block diagram illustrating a public switched telephone network (PSTN) processing environment, in accordance with an embodiment of the present invention.

Embodiments of the present invention recognize that voice calls placed on-hold continue to consume bandwidth associated with the voice call connection. The bandwidth associated with the on-hold calls of the telephonic connection provides no useful transmission service other than to retain the connection of the on-hold call of an end-user caller until a answering representative is available to connect to the caller. For example, a call center may have a plurality of voice calls from different callers placed on-hold as a result of all answering representatives being unavailable, attending to other callers. The on-hold calls may receive audio content, for instance music or recorded messages, which consumes bandwidth of a telecommunications environment between the call center and the callers, but provides little productive service other than to retain the connection with the callers until a representative is available.

Embodiments of the present invention reduce the bandwidth consumed by the on-hold calls by decoupling the dedicated bandwidth and retaining the contact information of the calling device and the local connection of the calling device, by intermittently sending a "busy packet" within a time division multiplexed (TDM) transmission to the calling device to only maintain a connection between the calling device and a local exchange carrier. When an answering representative is available, a "re-connect packet" is sent to the calling device to re-establish a full connection on available bandwidth.

Implementation of such embodiments may take a variety forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a public switched telephone network (PSTN) processing environment, generally designated 100, in accordance with one embodiment of the present invention. PSTN processing environment 100 includes server computer 110, connection database 115, call center private branch exchange (PBX) 120, telephone trunk station 130, local exchange carrier (LEC) 140, and calling device 150.

Calling device 150 is a telecommunications capable device that initiates a voice call to PBX 120. Calling device 150 can be a hand-held phone, a speaker phone, a mobile phone, a pay phone, a private branch exchange (PBX) phone, a fixed line cordless phone, fixed line cord-connected phone, or a telephonic device capable of initiating and receiving voice calls utilizing land line telephonic trunk connections.

LEC 140 provides local telephone service to subscribers, usually within a metropolitan area, region or state. LEC 140 receives voice calls made from, and sent to calling devices within the local area, for example, calling device 150. Voice calls connected to LEC 140 may receive analog signals or digital signals from mobile devices connecting by a gateway to LEC 140. LEC 140 converts received calls into digital signals and combines them for greater transmission capacity over longer distances.

Voice calls transmitted via PSTN processing environment 100 utilizes a coder-decoder (codec) technique that samples a voice call at a frequency of 8000 times per second, using a digitizing technique is referred to as pulse code modulation (PCM) and is used in transport carriers such as a T1 carrier, which can carry samplings for 24 voice calls on separate channels using time division multiplexing (TDM). TDM allows channels to send data in a sequential alternating manner, such that transmission time is shared equally by each of the 24 channels. A T1 carrier transmission includes a sampling frame period of 125 micro-seconds and the transmission includes 8 bits of data for each of the 24 channels. This results in a 64 Kbps transmission rate for each channel and, including a framing bit for each sampling, a total T1 transmission rate of 1.544 Mbps.

Telephone trunk station 130 further concatenates transmissions from multiple LECs, such as LEC 140, and supports higher speed transmission with further multiplexing and interlacing by use of synchronous optical networking (SONET) as part of the Synchronous Digital Hierarchy (SDH). Telephone trunk substation 130 sends and receives long distance transmissions to and from other telephone trunk stations; the number of trunk stations depends upon the distance of the call.

Call center private branch exchange (PBX) 120, hereafter PBX 120, is an entity that receives a large volume of voice calls and is staffed by a specific number of voice call answering representatives, for example, a customer service call-in center. PBX 120 is designed operationally so that on average, the number of incoming calls is equal to or greater than the available staff of answering representatives available, insuring representatives remain productively engaged, but creating a "waiting" condition for voice calls when representatives are not available. PBX 120, receiving a large volume of calls, uses a PBX in place of using a common local exchange, such as LEC 140. The PBX connects the calling devices of PBX 120 to trunk lines of the PSTN, such as telephone trunk substation 130. PBX 120 is a destination recipient of voice calls.

When all representatives of PBX 120 are unavailable, the PBX system places "waiting" calls in an on-hold state in which the connection is maintained and continues to consume the bandwidth of the transmission, however, no two-way voice communication is possible. In some instances, voice calls receive recorded messages stating that call receivers are not available and that the voice call will be connected to the next available answering representative (usually in the order in which voice calls have been placed on-hold), followed by one or a combination of music and messages.

The PBX system of PBX 120 determines that an answering representative is available when the current voice call connection for a answering representative is disconnected, and the PBX system connects the next-in-line on-hold call to the available answering representative. While in an on-hold state, the call remains connected from calling device 150 to PBX 120, unproductively consuming a portion of bandwidth of the transmission lines.

Server computer 110 is connected to PSTN processing environment 100 via PBX 120. Server computer 110 can be a desktop computer, a laptop computer, a specialized computer server, a client computer, a tablet, a netbook personal computer (PC), a personal digital assistant (PDA), a smart phone, a mainframe computer, a web server computer, or a networked server computer. Further, server computer 110 can represent computing systems utilizing clustered computers and components to act as single pools of seamless resources when accessed through PSTN processing environment 100, as is common in data centers and with cloud computing applications. In general, server computer 110 is representative of any programmable electronic device or combination of programmable electronic devices capable of executing machine-readable program instructions. Server computer 110 can include internal and external hardware components, as depicted and described in further detail with respect to FIG. 5.

Server computer 110 includes bandwidth reduction program 300 which reduces the bandwidth consumed by voice calls on-hold by identifying the calling device, leaving the connection to the LEC in place and freeing up the bandwidth of telephone trunk station transmission lines, such as telephone trunk station 130. Server 110 also includes connection database 115 which contains connection information of calling devices and calling center 120 such that when answering representatives are available, the voice call from calling device 150 can be connected to the answering representative, from the remaining connection between calling device 150 and LEC 140. Connection database 115 can be stored internal to server computer 110 or can be accessed by server computer 110 via network connection.

Bandwidth reduction program 300 resides on server computer 110 and has access to PSTN processing environment 100 and works in conjunction with the PBX system of PBX 120. Bandwidth reduction program 300 determines when a voice call is placed on-hold, and transmits a channel slot with code data that releases the bandwidth consumed by the on-hold call, including the transmission bandwidth from PBX 120 to the trunk lines to LEC 140, but retains a connection between calling device 150 and the LEC 140, so that calling device 150 can be connected to an answering representative when one becomes available. The bandwidth unproductively consumed by on-hold voice calls becomes available for productive use.

Figure 2:
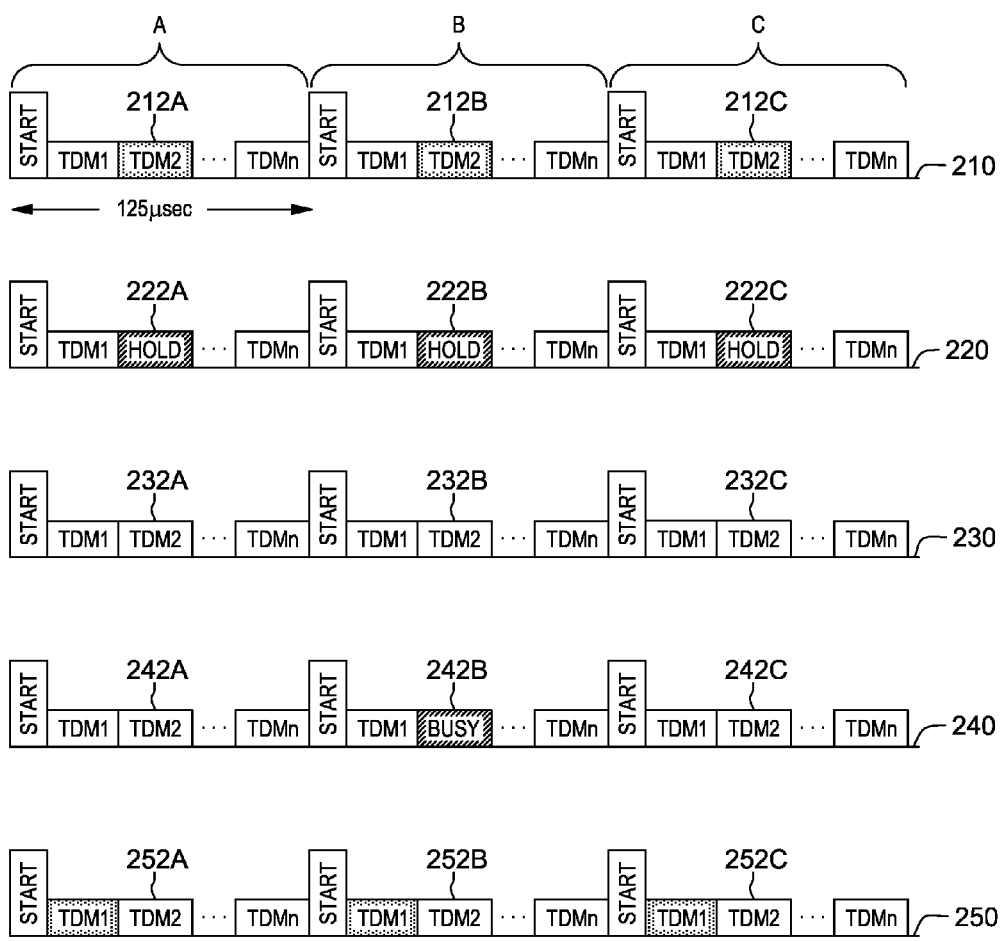
FIG. 2 is a block diagram depicting an exemplary sequence of a time division multiplexed (TDM) channel for a voice call that is put on-hold, in accordance with an embodiment of the present invention.

FIG. 2 is a block diagram depicting an exemplary transmission period sequence of time division multiplexed (TDM) channels including a voice call that is put on-hold, in accordance with an embodiment of the present invention. The voice call can be from a calling device, such as calling device 150, to a call center, such as PBX 120, for example. Transmission period 210 depicts a sequence of frames A, B, and C respectively, each frame includes a plurality of TDM channel slots, each carrying samplings of a voice call, on channel slots TDM1, TDM2, up to channel TDMn, (for a T1 carrier, this would correspond up to twenty four channels). Channel slots 212A, 212B, and 212C, depict a transmission of a voice call sampling carried on TDM2, for frames A, B, and C, which can be, for example, a voice call from calling device 150 to PBX 120.

Transmission period 220 depicts a sequence of frames A, B, and C, in which the voice call carried on TDM2 is placed on-hold, as shown by channel slots 222A, 222B, and 222C. The voice call carried on TDM2 continues to consume the same amount of transmission bandwidth between calling device 150 and PBX 120 without productive use of the bandwidth. The identification information associated with the voice call is stored in connection database 115 as the voice call is placed on-hold. This enables the re-connection of the voice call to an available representative at PBX 120 at a later time.

In an embodiment of the present invention, transmission period 230 depicts that bandwidth consumed by the voice call carried by channel TDM2 has been released and is available to carry sampling of an alternate voice call. Channel slots 232A, 232B, and 232C no longer indicate that the channel slot signal carried on TDM2 consumes bandwidth for the first voice call that had been put in an on-hold state. The bandwidth released by the first voice call includes the bandwidth from PBX 120 to telephone trunk station 130, the trunk transmission level between trunk stations, and the bandwidth between LEC 140 and telephone trunk station 130.

For example, a first voice call placed by calling device 150 is received by calling center 120 and placed on hold. In an embodiment of the present invention, the first voice call connection between PBX 120, telephone trunk station 130, and LEC 140 is released, making the bandwidth available for an alternate voice call. The transmission channel slot carrying the sampling of the first voice call, such as channel slots 222A, 222B, and 222C, are released and the transmission channel slot, such as TDM2, is available to carry data for an alternate voice call, as depicted in channel slots 232A, 232B, and 232C.

Transmission period 240 depicts a sequence of transmission frames A, B, and C, in which channel slot 242A is carrying data associated with an alternate voice call. Transmission frame B includes channel slot 242B which depicts the channel slot periodically carrying a "busy" code, directed to LEC 140, maintaining a connection between LEC 140 and calling device 150, and reflecting the fact that call center representatives are busy with other calls and are not yet available to answer the first voice call. The channel slot "busy" code maintains the connection between LEC 140 and calling device 150, but utilizes a small fraction of the transmission bandwidth. Transmission frame C includes channel slot 242C, which depicts the channel slot again carrying sampling for an alternate voice call. The "busy" code channel slot depicted by 242B is transmitted at a frequency to maintain the connection between LEC 140 and calling device 150, but at a low enough frequency to release nearly all the bandwidth previously consumed by the on-hold call. A frequency of delivering a busy code signal once every five seconds is representative, but can vary based on the connection requirements of an LEC. This concept is known as "stealing a time slot". Once every five seconds, for example, the "busy" code "steals" one TDM time slot. Stealing of this time slot to maintain the overall connection does not affect the overall usage of bandwidth within the trunk system.

Transmission period 250 depicts a sequence of transmission frames A, B, and C, in which a call center representative is available and the voice call is connected to the call center representative. Channel slots 252A, 252B, and 252C depict the voice call as re-connected and carried on available bandwidth corresponding with channel TDM1.

For example, the voice call from calling device 150 is connected to LEC 140 and receives a "busy" code in intermittently transmitted channel slot 242B, which maintains the connection between calling device 150 and LEC 140. As a representative of PBX 120 becomes available, a re-connect message is sent to calling device 150, using available bandwidth, which may not be the same channel slot with which the initial connection was made. The reconnect message uses the information stored on connection database 115 to identify and re-connect the voice call—LEC connection, to the available representative.

Figure 3:
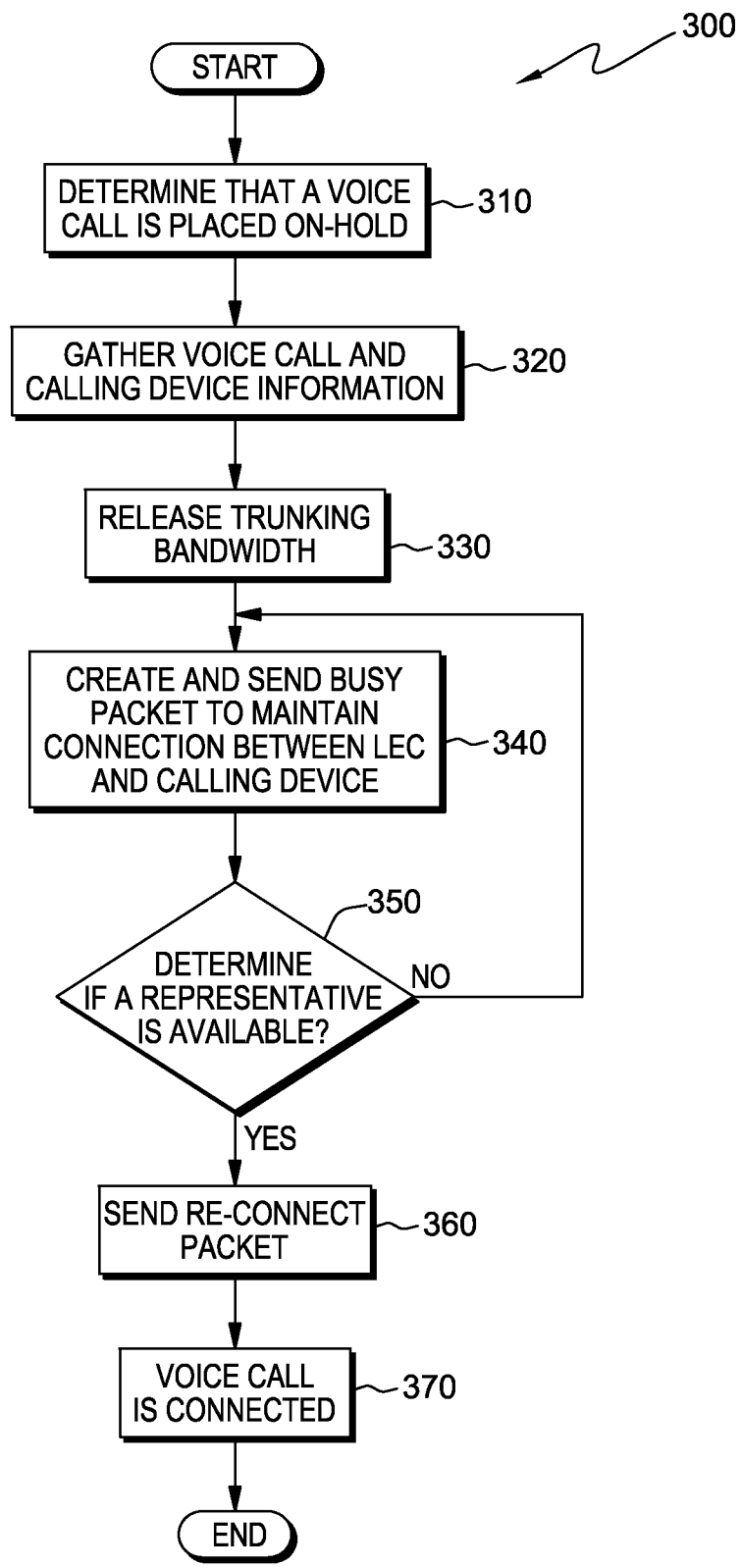
FIG. 3 is a flowchart depicting operational steps of a bandwidth reduction program, on a server computer within the telecommunications processing environment of FIG. 1, for freeing-up bandwidth consumed by on-hold voice calls, in accordance with an embodiment of the present invention.

FIG. 3 is a flowchart depicting operational steps of bandwidth reduction program 300, on a server computer within telecommunications processing environment 100 of FIG. 1, for releasing bandwidth consumed by on-hold voice calls, in accordance with an embodiment of the present invention. In one embodiment of the present invention, bandwidth reduction program 300 operates in conjunction with a connection protocol that is enhanced to recognize signaling code included in packets sent to LEC 140 to disconnect trunk bandwidth of the voice call, maintain a connection between LEC 140 and calling device 150, and connect the voice call to a representative, when available. In one embodiment, bandwidth reduction program 300 is a separate program, initiated by the PBX system of PBX 120 when a voice call is placed on hold. In another embodiment, bandwidth reduction program 300 is an integrated component of the PBX system of PBX 120 and operates to a protocol that releases the bandwidth of a call placed on hold from PBX 120, through telephone trunk station 130, to the local exchange carrier of calling device 150 making the voice call.

Bandwidth reduction program 300 determines that a voice call is placed on-hold (step 310). The PBX system for PBX 120 receives a voice call and finding no available representative to take the call, places the voice call on-hold. Bandwidth reduction program 300 receives information from the PBX system and determines that a call is on-hold.

Bandwidth reduction program 300 gathers the voice call and calling device information for the voice call that is placed on hold (step 320). The voice call that is placed on hold is identified, along with calling device 150 that placed the voice call, by the control information associated with the voice call. This information includes, at least in part, the digits dialed from calling device 150 and the billing number of calling device 150, as part of the signaling protocol. The control information is stored by bandwidth reduction program 300 in connection database 115, to be used to reconnect the voice call when an answering representative is determined to be available.

For example, having determined that a voice call is placed on hold, bandwidth reduction program 300 gathers the dialed number and the billing number of the voice call identifying calling device 150 as the source of the voice call, and PBX 120 as the destination of the voice call. Bandwidth reduction program 300 stores the control information associated with the call in connection database 115.

Having gathered the information associated with the voice call and calling device 150, bandwidth reduction program 300 releases the trunk level bandwidth (step 330). Bandwidth reduction program 300, using the control information associated with the voice call placed on hold, sends a packet (a first packet) containing information to LEC 140, indicating that the voice call connection is to be released from the call center (destination), through the trunk station 130 to LEC 140. The packet is interpreted by trunk station 130 and the LEC 140 to disconnect the voice call from the destination to LEC 140 and retain the connection from the LEC to the calling device. The bandwidth from LEC 140 to PBX 120 is released.

For example, having gathered the control information from the voice call, bandwidth reduction program 300 sends a first type of packet from PBX 120 to LEC 140 that includes code information such as "##" as a code included in a packet indicating that the connection from PBX 120 through telephone trunk station 130, to LEC 140 is to be released. The channel slots, such as channel slots 232A, 232B, and 232C**, previously carrying the voice call sampling are released, freeing bandwidth, and are available to carry samplings of alternate voice calls.

The bandwidth from PBX 120 to LEC 140 is released; however, the voice call remains connected from LEC 140 to calling device 150. Bandwidth reduction program 300 creates and sends a "busy" packet (a second packet) to LEC 140 to maintain the connection between LEC 140 and calling device 150 (step 340).

For example, bandwidth reduction program 300 creates and delivers a second type of packet referred to as a "busy" packet, to LEC 140. The packet includes a unique code comprised of a combination of non-numeric characters recognized by LEC 140 to maintain the connection of the voice call with calling device 150 and wait to receive call back indication. The unique code can include combinations of "*" and "#" characters, for example, a "*###*" code is carried to LEC 140 by a channel slot, such as channel slot 242B (FIG. 2). The "busy" packet is delivered periodically, for example, a packet every five seconds, to avoid a time-out and loss of the connection between LEC 140 and calling device 150.

Bandwidth reduction program 300 determines if a representative is available to connect to the voice call (decision step 350). Determining that a representative is available (step 350, "YES" branch), bandwidth reduction program 300 links the available representative with the voice call and calling device information stored on connection database 115. Bandwidth reduction program 300 continually receives information from the call center PBX system indicating the call status of representatives. When a representative from PBX 120 disconnects from another call, the status of the representative is changed to available, and the released voice call, having calling device information stored in connection database 115, is associated with the available representative.

As the representative indicates availability to accept a connection to the voice call, bandwidth reduction program 300 sends a "re-connect" packet (step 360), to LEC 140, including the information associated with the identification of calling device 150 and the destination for reconnecting the voice call. For example, bandwidth reduction program 300 receives an indication that a call center (PBX 120) representative has disconnected from a previous voice call and is available. Bandwidth reduction program 300 retrieves the information stored in connection database 115, associated with the voice call that was released from being put on hold, and creates a third type of packet including a "re-connect" code, such as "*#*#", and sends the packet to LEC 140, which is maintaining a connection with calling device 150. The "re-connect" packet includes information identifying calling device 150, the voice call destination of PBX 120, and a code indicating the voice call to PBX 120 is to be connected to the available representative.

Using the information in the "re-connect" packet, the voice call is connected (step 370) from LEC 140, through the trunk stations, to the representative at the call center, using an available channel of the bandwidth. For example, the voice call connection is completed between LEC 140, through telephone trunk station 130, to the representative at PBX 120, and bandwidth reduction program 300 ends. The connection uses an available channel of the bandwidth, which may be different than the initial channel used by the voice call that was put on-hold.

If bandwidth reduction program 300 determines that a representative is not available (step 350, "No" branch), bandwidth reduction program 300 sends an intermittent "busy" packet to maintain the connection between LEC 140 and calling device 150 (step 340), and continues to monitor for an available call center representative.

Figure 4:
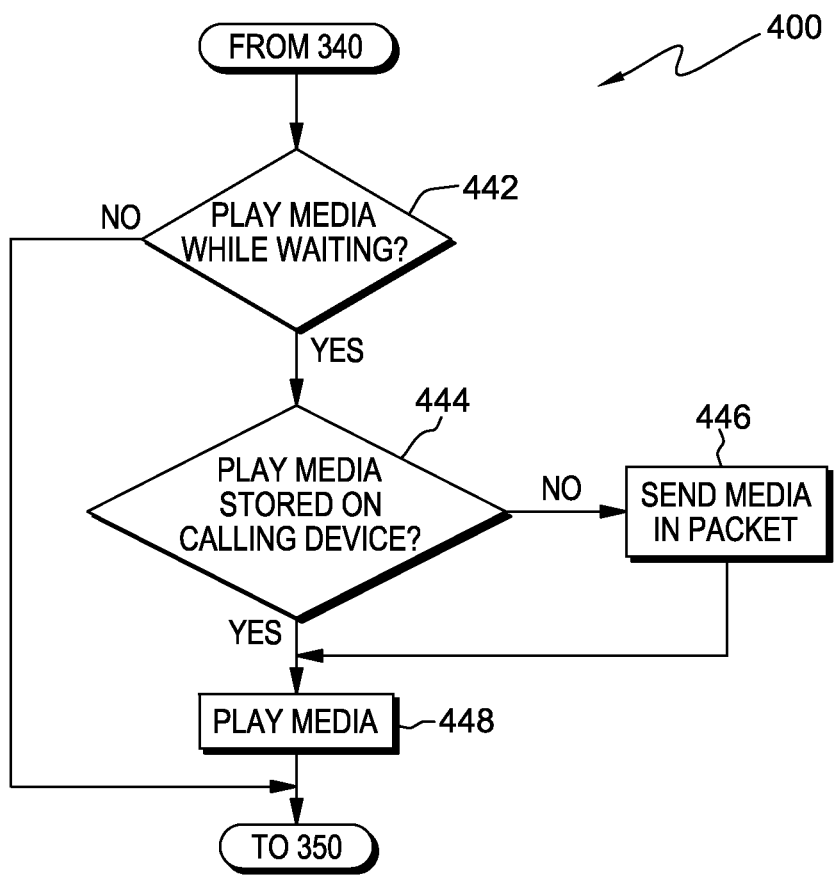
FIG. 4 is a flowchart depicting the operational steps of bandwidth reduction media program including enablement of playing media files while waiting for connection to a representative, in accordance with an embodiment of the present invention.

FIG. 4 is a flowchart depicting the operational steps of bandwidth reduction media program 400 including enablement of playing media files while waiting for connection to a representative, in accordance with an embodiment of the present invention. In an alternate embodiment of the present invention, bandwidth reduction media program 400 performs the operational steps of bandwidth reduction program 300 and in addition includes steps enabling the playing of media files while calling device 150 is connected to LEC 140 waiting for an available representative. Note that the embodiment noted in FIG. 4 is done at the LEC only. Because this is implemented at the LEC, there is no affect on the trunk bandwidth.

Proceeding as described in the discussion of FIG. 3, bandwidth reduction media program 400 performs steps 310, 320, 330, and 340, as described above with reference to FIG. 3. Bandwidth reduction media program 400 includes a message in the "busy" packet that is delivered to LEC 140 and forwarded to calling device 150 to determine if the user of calling device 150 wishes to play media while waiting for a representative to respond (step 442). If calling device 150 is unable to play media files, or if the user of calling device 150 declines playing media, the message response defaults to "NO" (step 442, "NO" branch), and bandwidth reduction media program 400 returns to step 350 (FIG. 3) and monitors to determine if a representative is available.

For example, if calling device 150 is unable to play media files, the message from the "busy" packet sent by bandwidth reduction media program 400 defaults to a "NO" response for playing media files while waiting for a representative, and bandwidth reduction media program 400 returns to step 350 monitoring to determine if a representative is available. Similarly, if the user of calling device 150 indicates a preference to not play media files while waiting for a representative, by responding to a displayed dialog message, for example, bandwidth reduction media program 400 returns to step 350 to determine if a representative is available, without playing media files.

Determining that the user of the calling device wishes to play media while waiting for a representative (step 442, "YES" branch), a "busy" packet message receives input as to a preference to play media stored on the calling device. Determining that the preference is to play media stored on the calling device (step 444, "YES" branch), bandwidth reduction program continues to send intermittent "busy" packets to maintain the connection between LEC 140 and calling device 150 and enables calling device 150 to play media files stored on calling device 150. Confirming the preference to play media files stored on calling device 150, the media file is played (step 448).

For example, bandwidth reduction media program 400 sends a "busy" packet to LEC 140, which is maintaining a connection with calling device 150. The packet includes a message to calling device 150 to determine a preference to play media stored on calling device 150. Bandwidth reduction media program 400 determines a preference to play media stored on the calling device and stored media files are played on calling device 150. Playing of media files is terminated upon receipt of the third type of packet; the "re-connect" packet, which connects the voice call to the available representative.

If calling device 150 is unable to play media files or the preference of not playing media files stored on calling device 150 is indicated (step 444, "NO" branch), bandwidth reduction media program 400 sends media in the "busy" packets (step 446), sent intermittently to LEC 140 maintaining the connection with calling device 150. The media file(s) are received by calling device 150 and calling device 150 plays the media (step 448), until a representative is available and responds, at which point a "re-connect" packet is received and media playing is terminated.

Figure 5:
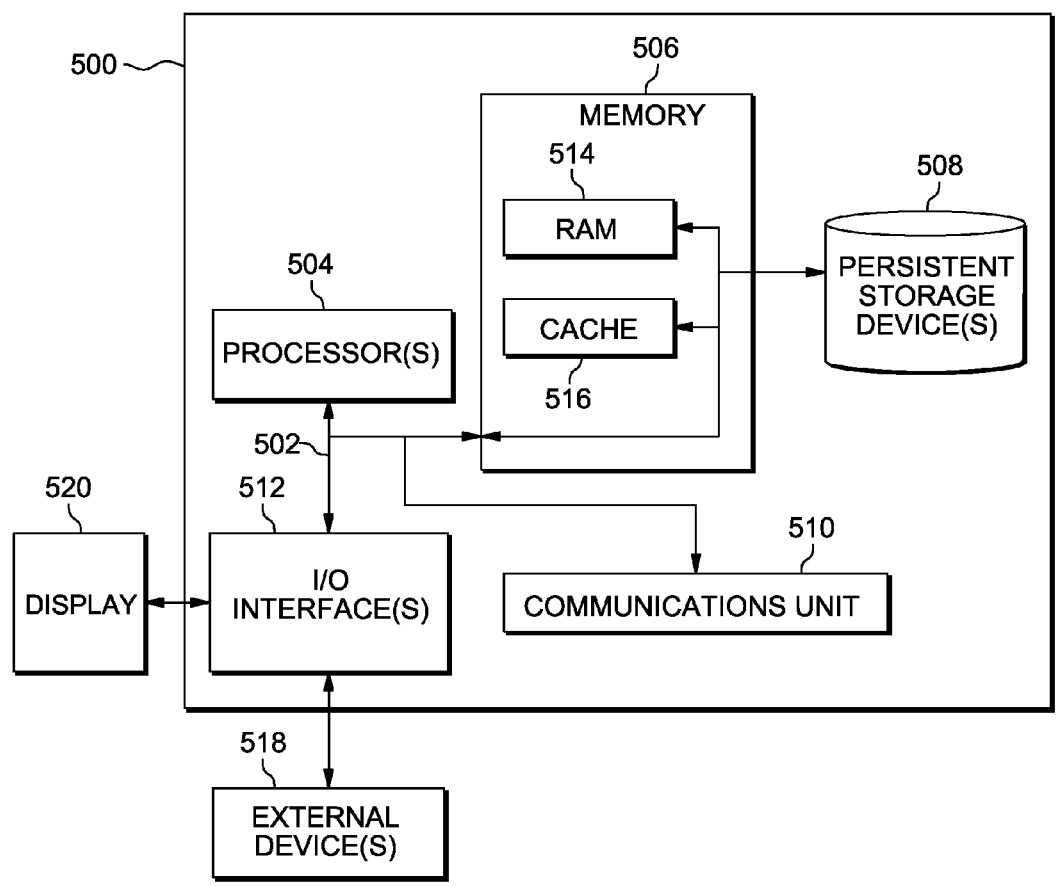
FIG. 5 depicts a block diagram of components of a server computer capable of executing operational steps of a bandwidth reduction program, inserted on a computing device within the telecommunications processing environment of FIG. 1, in accordance with an embodiment of the present invention.

Server computer 110 may include internal and external hardware components, as depicted and described in further detail with respect to server computer 500 of FIG. 5.

FIG. 5 depicts a block diagram of components of server computer 500, capable of executing operational steps of bandwidth reduction program 300 and bandwidth reduction media program 400, within PSTN processing environment 100 of FIG. 1, in accordance with an embodiment of the present invention.

It should be appreciated that FIG. 5 provides only an illustration of one implementation and does not imply any limitations with regard to the environments in which different embodiments may be implemented. Many modifications to the depicted environment may be made.

Server computer 500 includes communications fabric 502, which provides communications between computer processor(s) 504, memory 506, persistent storage device(s) 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage device(s) 508 are computer-readable storage media. In this embodiment, memory 506 includes random access memory (RAM) 514 and cache memory 516. In general, memory 506 can include any suitable volatile or non-volatile computer-readable storage media.

Bandwidth reduction program 300, bandwidth reduction media program 400, and connection database 115 are stored in persistent storage device(s) 508 for execution and/or access by one or more of the respective computer processors 504 via one or more memories of memory 506. In this embodiment, persistent storage device(s) 508 includes a magnetic hard disk drive. Alternatively, or in addition to a magnetic hard disk drive, persistent storage device(s) 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device(s) 508 may also be removable. For example, a removable hard drive may be used for persistent storage device(s) 508. Other examples include optical and magnetic disks, thumb drives, and smart cards that are inserted into a drive for transfer onto another computer-readable storage medium that is also part of persistent storage device(s) 508.

Communications unit 510, in these examples, provides for communications with other data processing systems or devices, including resources of PSTN processing environment 100. In these examples, communications unit 510 includes one or more network interface cards. Communications unit 510 may provide communications through the use of either or both physical and wireless communications links. Bandwidth reduction program 300, bandwidth reduction media program 400, and connection database 115, may be downloaded to persistent storage device(s) 508 through communications unit 510.

I/O interface(s) 512 allows for input and output of data with other devices that may be connected to server computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., bandwidth reduction program 300, bandwidth reduction media program 400, and connection database 115, can be stored on such portable computer-readable storage media and can be loaded onto persistent storage device(s) 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   by computer program instructions on a computing device, determining that a call of a calling device is placed on-hold;
   sending a first packet to a local exchange carrier (LEC) of the calling device, wherein the first packet includes instructions to release at least some bandwidth of the call placed on-hold;
   sending a second packet intermittently to the LEC, wherein the second packet maintains a connection between the calling device and the LEC;
   determining a representative is available wherein the representative is a recipient of the call; and
   in response to determining the representative is available to connect to the call, sending a third packet to the LEC to connect the calling device to the representative that is available
   utilizing a connection protocol to:
      recognize signaling codes included in one or more of the first packet, the second packet and the third packet;
      disconnect trunk bandwidth of the call;
      maintain a connection between the LEC and the calling device; and
      connect the call to the representative that is available.

2. The method of claim 1, wherein the at least some bandwidth is transmission capacity for calls over land line transmission paths of a PSTN network from the LEC of the calling device to the recipient of the call.

3. The method of claim 1, wherein the first, second and third packets include information identifying the calling device and a destination recipient of the call.

4. The method of claim 1, wherein the second packet (busy packet) is transmitted at a frequency of at least once every 10 seconds.

5. The method of claim 1, wherein the step of sending the second packet intermittently to the LEC, further comprises:
   in response to determining a preference to play media stored on the calling device, enabling at least one media file to play until the third packet is received by the LEC; and
   in response to receiving the third packet, terminating playing of the at least one media file.

6. The method of claim 1, wherein the step of sending the second packet intermittently to the LEC, further comprises:
   in response to determining a preference to receive at least one media file to play, sending within the second packet at least one media file; and
   in response to receiving the third packet, terminating playing of the at least one media file.

7. A computer program product for reducing bandwidth consumption of calls put on-hold, the computer program product comprising: a computer-readable storage medium, wherein the computer-readable storage medium is not a signal, wherein the computer-readable storage medium includes computer program instructions that when executed by a computer cause the computer to carry out the operations of:

determining that a call of a calling device is placed on-hold;

sending a first packet to a local exchange carrier (LEC) of a calling device, wherein the first packet includes instructions to release the bandwidth of the call placed on-hold, between the LEC and a recipient of the call;

sending a second packet intermittently to the LEC, wherein the second packet maintains a connection between the calling device and the LEC;

determining a representative is available, wherein the representative is a recipient of the call; and in response to determining the representative is available to connect to the call, sending a third packet to the LEC to connect the calling device to the representative that is available;

utilizing a connection protocol to:
recognize signaling codes included in one or more of the first packet, the second packet and the third packet;
disconnect trunk bandwidth of the call;
maintain a connection between the LEC and the calling device; and
connect the call to the representative that is available.

8. The computer program product of claim 7, wherein the bandwidth is transmission capacity for calls over land line transmission paths of a PSTN network.

9. The computer program product of claim 7, wherein the first, second and third packets include information identifying the calling device and a destination recipient of the call.

10. The computer program product of claim 7, wherein the second packet (busy packet) is transmitted at a frequency of at least once every 10 seconds.

11. The computer program product of claim 7, wherein the step of sending the second packet intermittently to the LEC, further comprises:

in response to determining a preference to play media stored on the calling device, enabling at least one media file to play until the third packet is received by the LEC; and in response to receiving the third packet, terminating playing of the at least one media file.

12. The computer program product of claim 7, wherein the step of sending the second packet intermittently to the LEC, further comprises:

in response to determining a preference to receive at least one media file to play, sending within the second packet at least one media file; and in response to receiving the third packet, terminating playing of the at least one media file.

13. A computer system for reducing bandwidth consumption of calls put on-hold, the computer system comprising:

one or more computer processors;

a computer-readable storage medium, wherein the computer-readable storage medium is not a signal; wherein the computer-readable storage medium includes computer program instructions that when executed by the one or more computer processors cause the computer system to carry out the operations of:

determining that a call of a calling device is placed on-hold;

sending a first packet to a local exchange carrier (LEC) of a calling device, wherein the first packet includes instructions to release the bandwidth of the call placed on-hold, between the LEC and a recipient of the call;

sending a second packet intermittently to the LEC, wherein the second packet maintains a connection between the calling device of the call and the LEC;

determining a representative is available wherein the representative is the recipient of the call; and in response to determining the representative is available to connect to the call, sending a third packet to connect the calling device to the representative that is available; and utilizing a connection protocol to:
recognize signaling codes included in one or more of the first packet, the second packet and the third packet;
disconnect trunk bandwidth of the call;
maintain a connection between the LEC and the calling device; and
connect the call to the representative that is available.

14. The computer system of claim 13, wherein the bandwidth is transmission capacity for calls over land line transmission paths of a PSTN network.

15. The computer system of claim 13, wherein the second packet (busy packet) is transmitted at a frequency of at least once every 10 seconds.

16. The computer system of claim 13, wherein the step of sending the second packet intermittently to the LEC, further comprises:

in response to determining a preference to play media stored on the calling device, enabling at least one media file to play until the third packet is received by the LEC; and in response to receiving the third packet, terminating playing of the at least one media file.

17. The computer system of claim 13, wherein the step of sending the second packet intermittently to the LEC, further comprises:

in response to determining a preference to receive at least one media file to play, sending within the second packet at least one media file; and in response to receiving the third packet, terminating playing of the at least one media file.

* * * * *